(12) United States Patent
Kroger et al.

(10) Patent No.: US 10,794,396 B2
(45) Date of Patent: Oct. 6, 2020

(54) INLET PRE-SWIRL GAS TURBINE ENGINE

(71) Applicant: General Electric Company, Schenectady, NY (US)

(72) Inventors: Christopher James Kroger, West Chester, OH (US); Trevor Wayne Goerig, Cincinnati, OH (US); Tsuguji Nakano, West Chester, OH (US); Jeffrey Donald Clements, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 545 days.

(21) Appl. No.: 15/625,251

(22) Filed: Jun. 16, 2017

(65) Prior Publication Data

US 2018/0363675 A1     Dec. 20, 2018

(51) Int. Cl.
| | |
|---|---|
| *F02C 7/04* | (2006.01) |
| *F04D 29/54* | (2006.01) |
| *F02K 3/06* | (2006.01) |

(52) U.S. Cl.
CPC .............. *F04D 29/542* (2013.01); *F02C 7/04* (2013.01); *F02K 3/06* (2013.01); *F05D 2220/32* (2013.01); *F05D 2220/36* (2013.01); *F05D 2240/12* (2013.01); *F05D 2250/51* (2013.01); *F05D 2250/71* (2013.01)

(58) Field of Classification Search
CPC ....................................................... F02C 7/04
See application file for complete search history.

(56) References Cited

U.S. PATENT DOCUMENTS

| | | | |
|---|---|---|---|
| 4,254,619 A | | 3/1981 | Giffin, III et al. |
| 4,981,414 A | * | 1/1991 | Sheets ............... F01D 5/145 |
| | | | 415/149.1 |
| 5,458,457 A | | 10/1995 | Goto et al. |
| 5,904,470 A | | 5/1999 | Kerrebrock et al. |
| 6,409,469 B1 | | 6/2002 | Tse |
| 6,546,734 B2 | | 4/2003 | Antoine et al. |
| 7,114,911 B2 | | 10/2006 | Martin et al. |
| 7,600,370 B2 | | 10/2009 | Dawson |
| 7,694,505 B2 | | 4/2010 | Schilling |
| 7,811,049 B2 | | 10/2010 | Xu |
| 7,845,902 B2 | | 12/2010 | Merchant |
| 7,878,001 B2 | | 2/2011 | Ishizaka et al. |

(Continued)

FOREIGN PATENT DOCUMENTS

CN           101069042 A     11/2007

OTHER PUBLICATIONS

United States Office Action Corresponding with U.S. Appl. No. 15/625,212 dated Jun. 17, 2019.

(Continued)

*Primary Examiner* — Woody A Lee, Jr.
(74) *Attorney, Agent, or Firm* — Dority & Manning, P.A.

(57) ABSTRACT

A gas turbine engine includes a turbomachine and a fan rotatable by the turbomachine. The fan includes a plurality of fan blades. The gas turbine engine also includes an outer nacelle surrounding the plurality of fan blades and including an inner wall, the inner wall of the outer nacelle including a plurality of pre-swirl contours positioned forward of the fan blades of the fan along an axial direction and extending inwardly along a radial direction.

20 Claims, 8 Drawing Sheets

(56) References Cited

U.S. PATENT DOCUMENTS

| | | | |
|---|---|---|---|
| 8,061,969 B2 | 11/2011 | Durocher et al. | |
| 8,152,445 B2 | 4/2012 | Guemmer | |
| 8,292,574 B2* | 10/2012 | Wood | F01D 5/142 415/199.5 |
| 8,459,035 B2 | 6/2013 | Smith et al. | |
| 8,915,700 B2 | 12/2014 | Kupratis et al. | |
| 2006/0133930 A1* | 6/2006 | Aggarwala | F01D 5/145 415/191 |
| 2008/0131272 A1 | 6/2008 | Wood et al. | |
| 2008/0159851 A1* | 7/2008 | Moniz | F01D 5/147 415/159 |
| 2009/0074568 A1 | 3/2009 | Suciu et al. | |
| 2010/0260591 A1 | 10/2010 | Martin et al. | |
| 2011/0241344 A1* | 10/2011 | Smith | F01D 1/30 290/52 |
| 2011/0286834 A1 | 11/2011 | Wardle et al. | |
| 2013/0019585 A1 | 1/2013 | Merry et al. | |
| 2014/0193238 A1 | 7/2014 | Sheridan et al. | |
| 2015/0027101 A1 | 1/2015 | Hasel | |
| 2015/0089958 A1 | 4/2015 | Suciu et al. | |
| 2015/0096303 A1 | 4/2015 | Schwarz et al. | |
| 2015/0252752 A1 | 9/2015 | Suciu | |
| 2015/0345392 A1 | 12/2015 | Merry et al. | |
| 2015/0345426 A1 | 12/2015 | Houston et al. | |
| 2015/0369046 A1 | 12/2015 | Roberge | |
| 2016/0061052 A1 | 3/2016 | Suciu et al. | |
| 2016/0084265 A1* | 3/2016 | Yu | F04D 29/542 415/1 |
| 2016/0114894 A1 | 4/2016 | Schwarz et al. | |
| 2016/0201568 A1 | 7/2016 | Sheridan et al. | |
| 2016/0201607 A1 | 7/2016 | Gallagher et al. | |
| 2016/0312799 A1* | 10/2016 | Yu | F04D 29/667 |
| 2017/0292227 A1 | 10/2017 | Kim | |
| 2017/0297728 A1 | 10/2017 | Niergarth et al. | |
| 2018/0163627 A1 | 6/2018 | Suciu et al. | |
| 2018/0355802 A1 | 12/2018 | Sheridan | |
| 2018/0356095 A1 | 12/2018 | Patel et al. | |
| 2018/0363554 A1 | 12/2018 | Kroger et al. | |
| 2018/0363676 A1 | 12/2018 | Kroger et al. | |
| 2018/0363678 A1* | 12/2018 | Kroger | F04D 29/563 |

OTHER PUBLICATIONS

Bobula et al., Effect of a part-span variable inlet guide vane on the performance of a high-bypass turbofan engine, https://ntrs.nasa.gov/search.jsp?R=19810016546, Aircraft Propulsion and Power, NASA-TM-82617, E-869, AVRADCOM-TR-81-C-10, Seventeenth Joint Propulsion Conf.; Colorado Springs, CO; Jul. 27-29, 1981; 15 pages.

Kandebo et al., "Geared-Turbofan Engine Design Targets Cost, Complexity"Aviation Week and Space Technology, McGraw-Hill Compagny, New York, NY, US, vol. 148, No. 8, Feb. 23, 1998, pp. 34-35, XP008174450.

Mattingly et al., Aircraft Engine Design, 2002, American Institute of Aeronautics and Astronautics, 2nd Edition, p. 292.

Chinese Office Action and Search Report Corresponding to Application No. 201810612524 dated Apr. 29, 2020.

* cited by examiner

┌─────────────────────────────────────────────────────────────────────────┐
│ ROTATING THE FAN OF THE GAS TURBINE ENGINE WITH THE DRIVE TURBINE OF THE │ — 302
│ TURBINE SECTION OF THE GAS TURBINE ENGINE SUCH THAT THE FAN ROTATES AT AN│
│ EQUAL ROTATIONAL SPEED AS THE DRIVE TURBINE                              │
└─────────────────────────────────────────────────────────────────────────┘
                                    ↓
┌─────────────────────────────────────────────────────────────────────────┐
│ ROTATING THE FAN OF THE GAS TURBINE ENGINE WITH THE DRIVE TURBINE SUCH   │ — 304
│ THAT THE FAN DEFINES A FAN PRESSURE RATIO LESS THAN 1.5                  │
└─────────────────────────────────────────────────────────────────────────┘

- ROTATING THE FAN OF THE GAS TURBINE ENGINE WITH THE DRIVE TURBINE SUCH THAT THE FAN DEFINES A FAN PRESSURE RATIO BETWEEN 1.15 AND 1.5 — 306

- ROTATING THE FAN OF THE GAS TURBINE ENGINE WITH THE DRIVE TURBINE SUCH THAT THE FAN DEFINES A FAN PRESSURE RATIO BETWEEN 1.25 AND 1.5 — 308

- ROTATING THE FAN OF THE GAS TURBINE ENGINE WITH THE DRIVE TURBINE SUCH THAT A FAN BLADE THE FAN DEFINES A FAN TIP SPEED GREATER THAN 1,250 FEET PER SECOND — 310

- ROTATING THE FAN OF THE GAS TURBINE ENGINE WITH THE DRIVE TURBINE SUCH THAT THE FAN BLADE OF THE FAN DEFINES A FAN TIP SPEED BETWEEN ABOUT 1,350 FEET PER SECOND AND ABOUT 2,200 FEET PER SECOND — 312

- ROTATING THE FAN OF THE GAS TURBINE ENGINE WITH THE DRIVE TURBINE SUCH THAT THE FAN BLADE OF THE FAN DEFINES A FAN TIP SPEED GREATER THAN ABOUT 1,450 FEET PER SECOND — 314

- ROTATING THE FAN OF THE GAS TURBINE ENGINE WITH THE DRIVE TURBINE SUCH THAT THE FAN BLADE OF THE FAN DEFINES A FAN TIP SPEED GREATER THAN ABOUT 1,550 FEET PER SECOND — 316

- OPERATING THE GAS TURBINE ENGINE AT A RATED SPEED — 318

- PRE-SWIRLING A FLOW OF AIR PROVIDED TO THE FAN OF THE GAS TURBINE ENGINE DURING OPERATION OF THE GAS TURBINE ENGINE — 320

- PRE-SWIRLING THE FLOW OF AIR PROVIDED TO THE FAN OF THE GAS TURBINE ENGINE USING AN INLET PRE-SWIRL FEATURE LOCATED UPSTREAM OF THE PLURALITY OF FAN BLADES OF THE FAN AND ATTACHED TO OR INTEGRATED INTO A NACELLE OF THE GAS TURBINE ENGINE — 322

FIG. 14

INLET PRE-SWIRL GAS TURBINE ENGINE

FIELD

The present subject matter relates generally to a gas turbine engine having one or more features for pre-swirling an airflow provided to a fan of the gas turbine engine during operation.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air using one or more fuel nozzles within the combustion section and burned to provide combustion gases. The combustion gases are routed from the combustion section to the turbine section. The flow of combustion gasses through the turbine section drives the turbine section and is then routed through the exhaust section, e.g., to atmosphere.

Typical gas turbine engines include a drive turbine within the turbine section that is configured to drive, e.g., a low pressure compressor of the compressor section and the fan. In order to operate the gas turbine engine more efficiently, it is desirable to operate the drive turbine at a relatively high rotational speed. However, rotation of the fan at relatively high rotational speeds can lead to inefficiencies, such inefficiencies stemming from, e.g., shock losses and flow separation of an airflow over fan blades of the fan.

Accordingly, certain gas turbine engines have been developed with reduction gearboxes that allow the fan to rotate slower than the drive turbine. However, certain gearboxes may add complication, weight, and expense to the gas turbine engine. Therefore, a gas turbine engine configured to allow the drive turbine to operate at relatively high and efficient rotational speeds, while minimizing corresponding inefficiencies with the fan would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining an axial direction and a radial direction is provided. The gas turbine engine includes a turbomachine and a fan rotatable by the turbomachine. The fan includes a plurality of fan blades. The gas turbine engine also includes an outer nacelle surrounding the plurality of fan blades and including an inner wall, the inner wall of the outer nacelle including a plurality of pre-swirl contours positioned forward of the fan blades of the fan along the axial direction and extending inwardly along the radial direction.

In certain exemplary embodiments each of the plurality of fan blades defines a fan blade span along the radial direction, wherein each of the plurality of pre-swirl contours defines a maximum height along the radial direction, and wherein the maximum height of each of the plurality of pre-swirl contours is between about two percent and about forty percent of the fan blade span of the plurality of fan blades. For example, in certain exemplary embodiments the maximum height of each of the plurality of pre-swirl contours is between about five percent and about thirty percent of the fan blade span of the plurality of fan blades.

In certain exemplary embodiments the plurality of pre-swirl contours includes between about five pre-swirl contours and about eighty pre-swirl contours.

In certain exemplary embodiments the plurality of pre-swirl contours includes between about thirty pre-swirl contours and about fifty pre-swirl contours.

In certain exemplary embodiments each of the plurality of pre-swirl contours defines a maximum swirl angle, and wherein the maximum swirl angle of each of the plurality of pre-swirl contours is between about five degrees and about forty degrees. For example, in certain exemplary embodiments each of the plurality of pre-swirl contours defines a ridge line and a maximum height, wherein the maximum height is located within the middle seventy-five percent of the ridge line, and wherein the maximum swirl angle is defined by the aft twenty-five percent of the ridge line.

In certain exemplary embodiments each of the plurality of pre-swirl contours defines a maximum height, a forward end, and an aft end, wherein a height of each of the plurality of pre-swirl contours at the forward end and at the aft end is less than about ten percent of the maximum height.

In certain exemplary embodiments the plurality of pre-swirl contours are formed integrally with at least a portion of the inner wall of the outer nacelle.

In certain exemplary embodiments each of the plurality of pre-swirl contours defines an arcuate shape along the axial direction.

In certain exemplary embodiments the turbomachine comprises a drive turbine, wherein the fan is mechanically coupled to and rotatable with the drive turbine such that the fan is rotatable by the drive turbine at the same rotational speed as the drive turbine. For example, in certain exemplary embodiments the fan defines a fan pressure ratio less than 1.5 and a fan tip speed greater than 1,250 feet per second during operation of the gas turbine engine at a rated speed.

In another exemplary embodiment of the present disclosure, an outer nacelle for a gas turbine engine including a fan and defining an axial direction and a radial direction is provided. The outer nacelle includes an inner wall surrounding a plurality of fan blades of the fan when installed in the gas turbine engine, the inner wall including a plurality of pre-swirl contours positioned forward of the fan blades of the fan along the axial direction when installed in the gas turbine engine and extending inwardly along the radial direction.

In certain exemplary embodiments each of the plurality of fan blades defines a fan blade span along the radial direction, wherein each of the plurality of pre-swirl contours defines a maximum height along the radial direction, and wherein the maximum height of each of the plurality of pre-swirl contours is between about two percent and about forty percent of the fan blade span of the plurality of fan blades. For example, in certain exemplary embodiments the maximum height of each of the plurality of pre-swirl contours is between about five percent and about thirty percent of the fan blade span of the plurality of fan blades.

In certain exemplary embodiments the plurality of pre-swirl contours includes between about five pre-swirl contours and about eighty pre-swirl contours.

In certain exemplary embodiments the plurality of pre-swirl contours includes between about thirty pre-swirl contours and about fifty pre-swirl contours.

In certain exemplary embodiments each of the plurality of pre-swirl contours defines a maximum swirl angle, wherein the maximum swirl angle of each of the plurality of pre-swirl contours is between about five degrees and about forty degrees. For example, in certain exemplary embodiments each of the plurality of pre-swirl contours defines a ridge line and a maximum height, wherein the maximum height is located within the middle seventy-five percent of the ridge line, and wherein the maximum swirl angle is defined by the aft twenty-five percent of the ridge line.

In certain exemplary embodiments each of the plurality of pre-swirl contours define an arcuate shape along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 14 is a flow diagram depicting a method for operating a gas turbine engine in accordance with an exemplary aspect of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, in certain contexts, the approximating language may refer to being within a 10% margin.

Here and throughout the specification and claims, range limitations may be combined and interchanged, such that ranges identified include all the sub-ranges contained therein unless context or language indicates otherwise.

Figure 1:
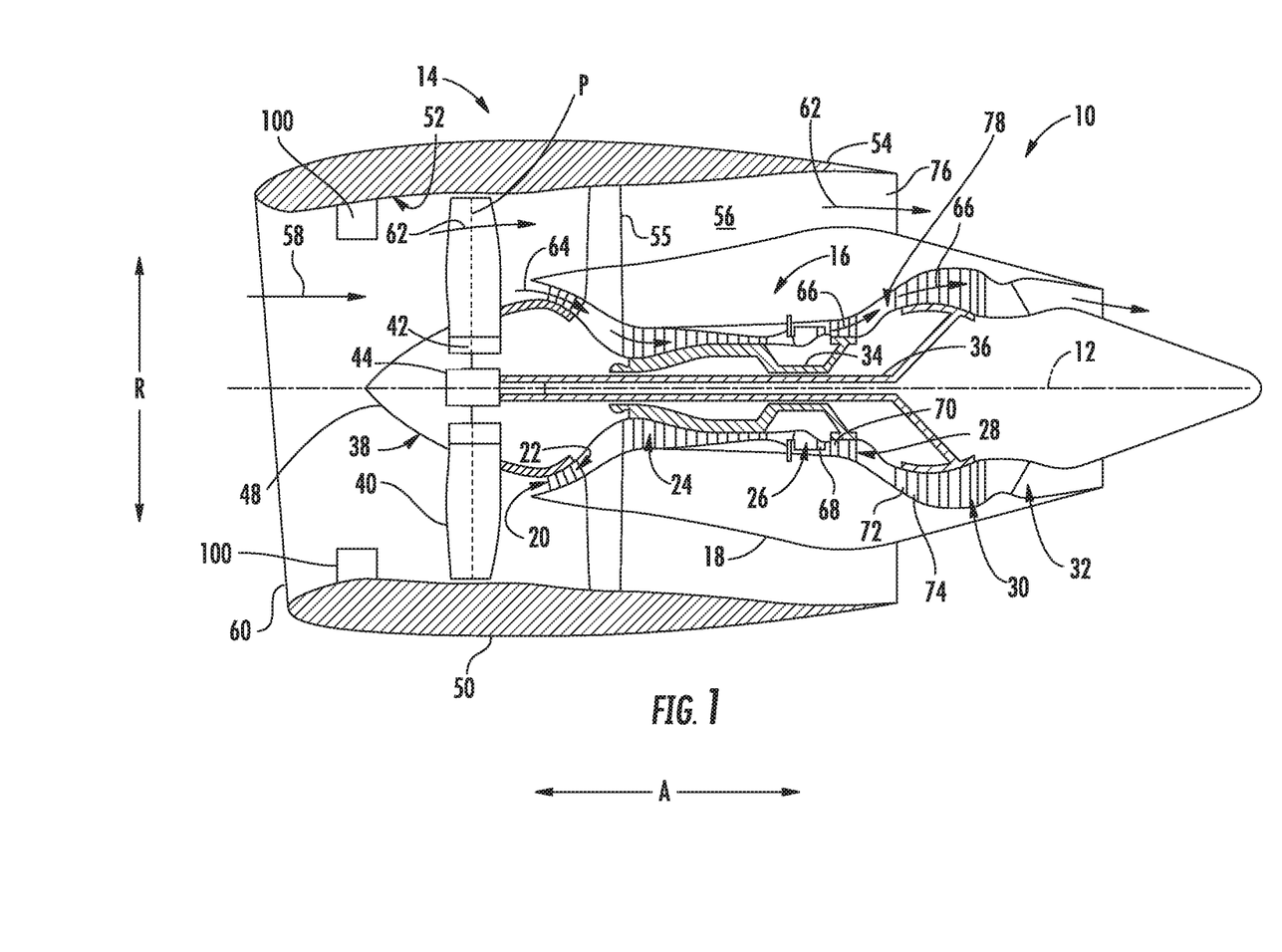
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; see, e.g., FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22. The LP turbine 30 may also be referred to as a "drive turbine".

For the embodiment depicted, the fan section 14 includes a variable pitch fan 38 having a plurality of fan blades 40 coupled to a disk 42 in a spaced apart manner. More specifically, for the embodiment depicted, the fan section 14 includes a single stage fan 38, housing a single stage of fan blades 40. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan 38 is mechanically coupled to and rotatable with the LP turbine 30, or drive turbine. More specifically, the fan blades 40, disk 42, and actuation member 44 are together rotatable about the longitudinal axis 12 by LP shaft 36 in a "direct drive" configuration. Accordingly, the fan 38 is coupled with the LP turbine 30 in a manner such that the fan 38 is rotatable by the LP turbine 30 at the same rotational speed as the LP turbine 30.

Further, it will be appreciated that the fan 38 defines a fan pressure ratio and the plurality of fan blades 40 each define a fan tip speed. As will be described in greater detail below, the exemplary turbofan engine 10 depicted defines a relatively high fan tip speed and relatively low fan pressure ratio during operation of the turbofan engine at a rated speed. As used herein, the "fan pressure ratio" refers to a ratio of a pressure immediately downstream of the plurality of fan blades 40 during operation of the fan 38 to a pressure immediately upstream of the plurality of fan blades 40 during the operation of the fan 38. Also as used herein, the "fan tip speed" defined by the plurality of fan blades 40 refers to a linear speed of an outer tip of a fan blade 40 along the radial direction R during operation of the fan 38. Further, still, as used herein, the term "rated speed" refers to a maximum operating speed of the turbofan engine 10, in which the turbofan engine 10 generates a maximum amount of power.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the plurality of fan blades 40 of the fan 38 and/or at least a portion of the turbomachine 16. More specifically, the nacelle 50 includes an inner wall 52 and a downstream section 54 of the inner wall 52 of the nacelle 50 extends over an outer portion of the turbomachine 16 so as to define a bypass airflow passage 56 therebetween. Additionally, for the embodiment depicted, the nacelle 50 is supported relative to the turbomachine 16 by a plurality of circumferentially spaced outlet guide vanes 55.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. For the embodiment depicted, the bypass ratio may generally be between about 7:1 and about 20:1, such as between about 10:1 and about 18:1. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 and described above is by way of example only, and that in other exemplary embodiments, the turbofan engine 10 may have any other suitable configuration. For example, in other exemplary embodiments, the turbomachine 16 may include any other suitable number of compressors, turbines, and/or shaft or spools. Additionally, the turbofan engine 10 may not include each of the features described herein, or alternatively, may include one or more features not described herein. For example, in other exemplary embodiments, the fan 38 may not be a variable pitch fan. Additionally, although described as a "turbofan" gas turbine engine, in other embodiments the gas turbine engine may instead be configured as any other suitable ducted gas turbine engine.

Referring still to FIG. 1, and as previously discussed, the exemplary turbofan engine 10 depicted in FIG. 1 is configured as a direct drive turbofan engine 10. In order to increase an efficiency of the turbomachine 16, the LP turbine 30 is configured to rotate at a relatively high rotational speed. Given the direct-drive configuration, such also causes the plurality of fan blades 40 of the fan 38 to rotate at a relatively high rotational speed. For example, during operation of the turbofan engine 10 at the rated speed, the fan tip speed of each of the plurality of fan blades 40 is greater than 1,250 feet per second. For example, in certain exemplary embodiments, during operation of the turbofan engine 10 at the rated speed, the fan tip speed of each of the plurality of fan blades 40 may be greater than about 1,350 feet per second, such as greater than about 1,450 feet per second, such as greater than about 1,550 feet per second, such as up to about 2,200 feet per second.

Despite these relatively fan tip speeds, the fan 38 is, nevertheless designed to define a relatively low fan pressure ratio. For example, during operation of the turbofan engine 10 at the rated speed, the fan pressure ratio of the fan 38 is less than 1.5. For example, during operation of the turbofan engine 10 at the rated speed, the fan pressure ratio may be between about 1.15 and about 1.5, such as between about 1.25 and about 1.4.

As will be appreciated, operating the direct drive turbofan engine 10 in such a manner may ordinarily lead to efficiency penalties of the fan 38 due to shock losses and flow separation of an airflow over the fan blades 40, especially at the radially outer tips of the plurality of fan blades 40 of the fan 38. Accordingly, as will be described in much greater detail below, the turbofan engine 10 may further include one or more inlet pre-swirl features upstream of the plurality of fan blades 40 of the fan 38 to offset or minimize such efficiency penalties of the fan 38. With the inclusion of such inlet pre-swirl features, the efficiency gains of the turbomachine 16 due to, e.g., increased rotational speeds of the LP turbine 30, outweigh the above identified potential efficiency penalties.

Figure 2:
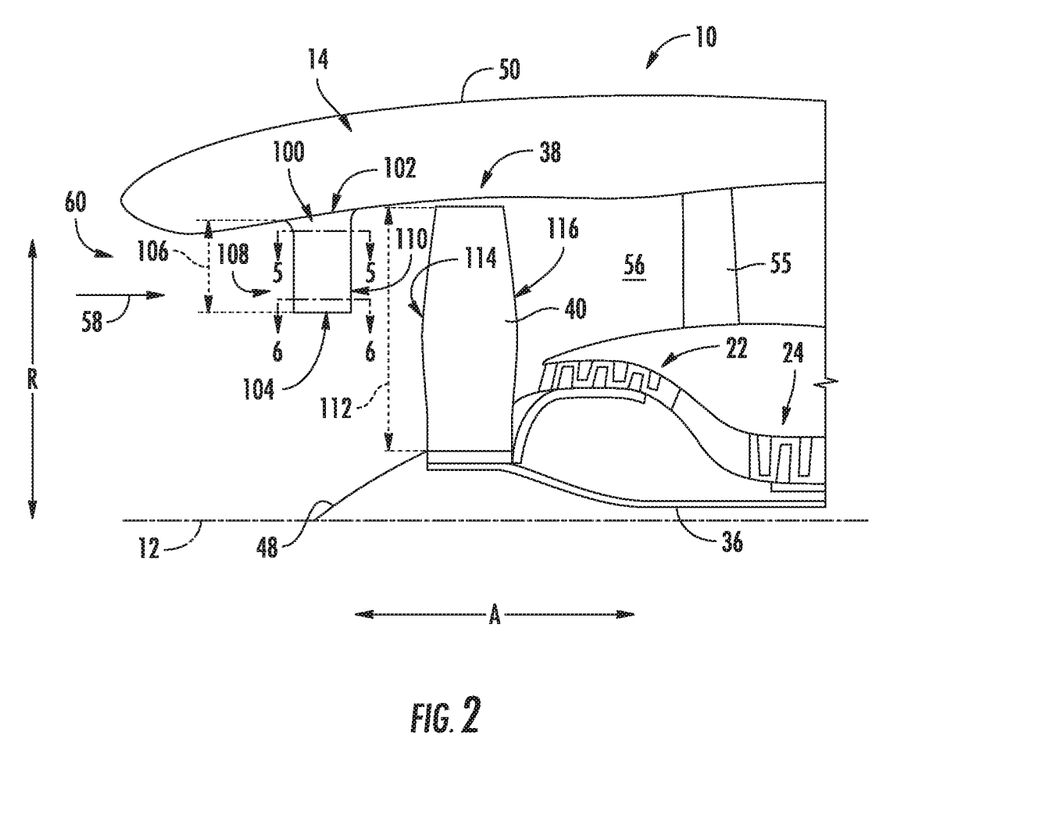
FIG. 2 is a close-up, schematic, cross-sectional view of a forward end of the exemplary gas turbine engine of FIG. 1.

Referring now also to FIG. 2, a close-up, cross-sectional view of the fan section 14 and forward end of the turbomachine 16 of the exemplary turbofan engine 10 of FIG. 1 is provided. As stated, the turbofan engine 10 includes an inlet pre-swirl feature located upstream of the plurality of fan blades 40 of the fan 38 and attached to or integrated into the nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from of the outer nacelle 50 (such as from the inner wall 52 of the outer nacelle 50) at a location forward of the plurality of fan blades 40 of the fan 38 along the axial direction A and aft of the inlet 60 of the nacelle 50. More specifically, each of the plurality of part span inlet guide vanes 100 define an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 104, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, is depicted, each of the plurality of part span inlet guide vanes 100 do not extend completely between the outer nacelle 50 and, e.g., the hub 48 of the turbofan engine 10. More specifically, for the embodiment depicted, each of the plurality of inlet guide vane define an IGV span 106 along the radial direction R, and further each of the plurality of part span inlet guide vanes 100 further define a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, it will be appreciated, that the plurality of fan blades 40 of the fan 38 define a fan blade span 112 along the radial direction R. More specifically, each of the plurality of fan blades 40 of the fan 38 also defines a leading edge 114 and a trailing edge 116, and the IGV span 106 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
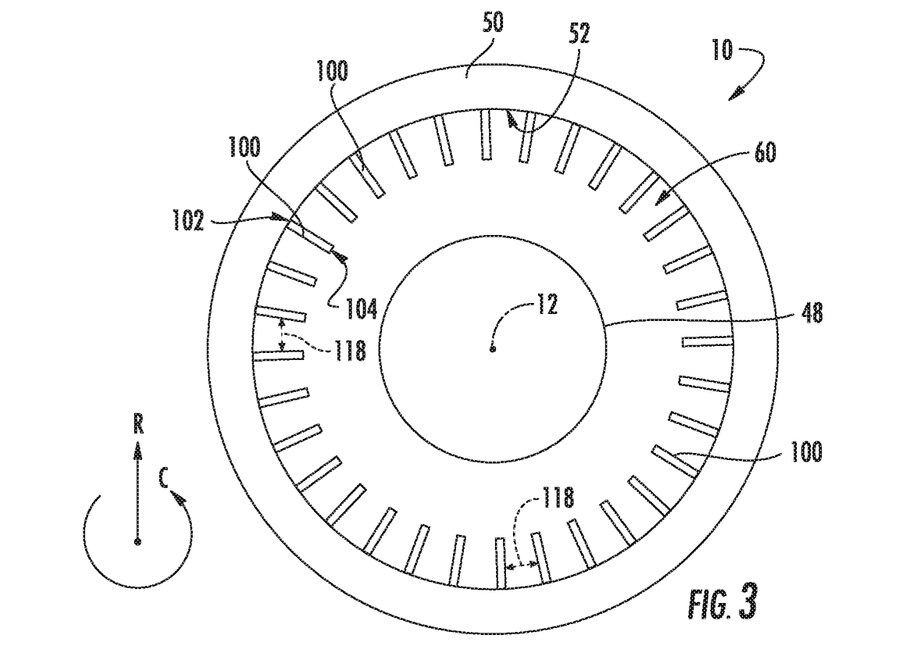
FIG. 3 is a schematic view of an inlet to the exemplary gas turbine engine of FIG. 1, along an axial direction of the gas turbine engine of FIG. 1.

Reference will now also be made to FIG. 3, providing an axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about twenty part span inlet guide vanes 100 and about fifty part span inlet guide vanes 100. More specifically, for the embodiment depicted, the plurality of part span inlet guide vanes 100 includes between about thirty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 are spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
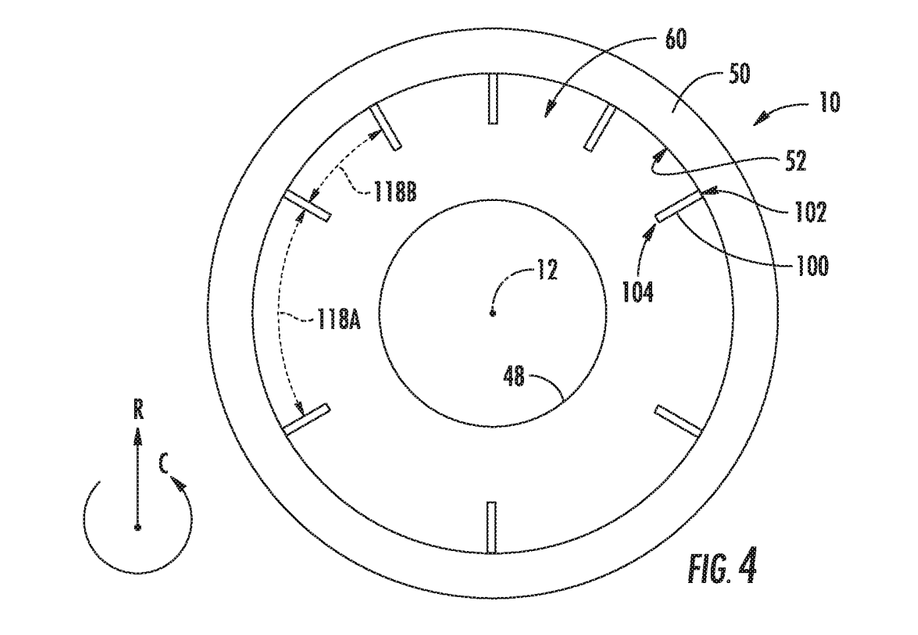
FIG. 4 it is a schematic view of an inlet to a gas turbine engine in accordance with another exemplary embodiment of the present disclosure.

Further, should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, as will be described in greater detail below, the circumferential spacing 118 refers to a mean circumferential spacing between adjacent part span inlet guide vanes 100. The non-uniform circumferential spacing may, e.g., offset structure upstream of the part span inlet guide vanes 100.

Referring now back to the embodiment of FIG. 2, it will be appreciated that each of the plurality of part span inlet guide vanes 100 is configured to pre-swirl an airflow 58 provided through the inlet 60 of the nacelle 50, upstream of the plurality of fan blades 40 of the fan 38. As briefly discussed above, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses of in efficiency.

Figure 5:
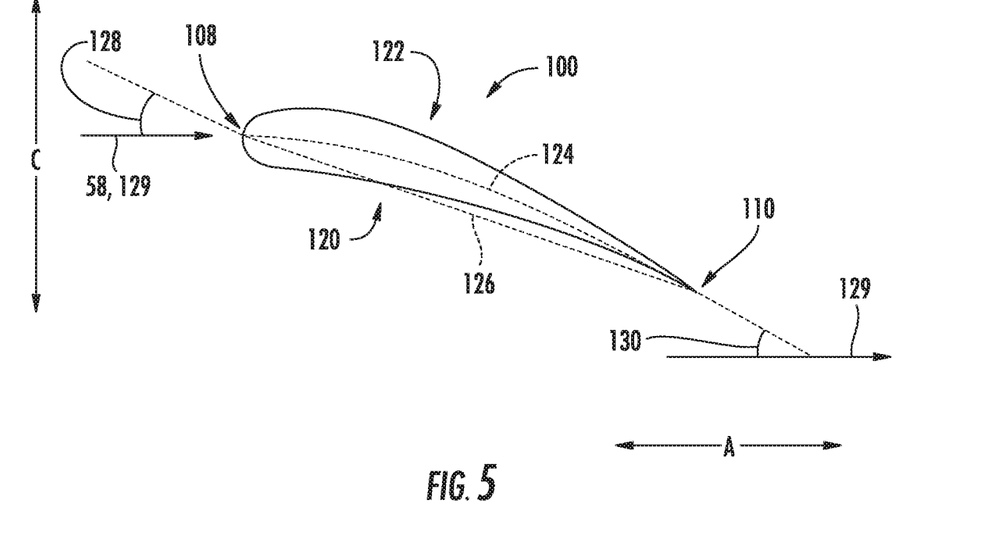
FIG. 5 is a cross-sectional view of a part span inlet guide vane of the exemplary gas turbine engine of FIG. 1 at a first location along a span of the part span inlet guide vane.

For example, referring first to FIG. 5, a cross-sectional view of one part span inlet guide vane 100 along the span of the part span inlet guide vanes 100, as indicated by Line 5-5 in FIG. 2, is provided. As is depicted, the part span inlet guide vane 100 is configured generally as an airfoil having a pressure side 120 and an opposite suction side 122, and extending between the leading edge 108 and the trailing edge 110 along a camber line 124. Additionally, the part span inlet guide vane 100 defines a chord line 126 extending directly from the leading edge 108 to the trailing edge 110. The chord line 126 defines an angle of attack 128 with an airflow direction 129 of the airflow 58 through the inlet 60 of the nacelle 50. Notably, for the embodiment depicted, the airflow direction 129 is substantially parallel to the axial direction A of the turbofan engine 10. For the embodiment depicted, the angle of attack 128 at the location depicted along the span 106 of the part span inlet guide vanes 100 is at least about five degrees and up to about thirty-five degrees. For example, in certain embodiments, the angle of attack 128 at the location depicted along the span 106 of the part span inlet guide vane 100 may be between about ten degrees and about thirty degrees, such as between about fifteen degrees and about twenty-five degrees.

Additionally, the part span inlet guide vane 100, at the location depicted along the span 106 of the part span inlet guide vane 100 defines a local swirl angle 130 at the trailing edge 110. The "swirl angle" at the trailing edge 110 of the part span inlet guide vane 100, as used herein, refers to an angle between the airflow direction 129 of the airflow 58 through the inlet 60 of the nacelle 50 and a reference line 132 defined by a trailing edge section of the pressure side 120 of the part span inlet guide vane 100. More specifically, the reference line 132 is defined by the aft twenty percent of the pressure side 120, as measured along the chord line 126. Notably, when the aft twenty percent the pressure side 120 defines a curve, the reference line 132 may be straight-line average fit of such curve (e.g., using least mean squares).

Further, it will be appreciated, that a maximum swirl angle 130 refers to the highest swirl angle 130 along the span 106 of the part span inlet guide vane 100. For the embodiment depicted, the maximum swirl angle 130 is defined proximate the radially outer end 102 of the part span inlet guide vane 100 (e.g., at the outer ten percent of the span 106 of the part span inlet guide vanes 100), as is represented by the cross-section depicted in FIG. 5. For the embodiment depicted, the maximum swirl angle 130 of each part span inlet guide vane 100 at the trailing edge 110 is between five degrees and thirty-five degrees. For example, in certain exemplary embodiments, the maximum swirl angle 130 of each part span inlet guide vane 100 at the trailing edge 110 may be between twelve degrees and twenty-five degrees.

Figure 6:
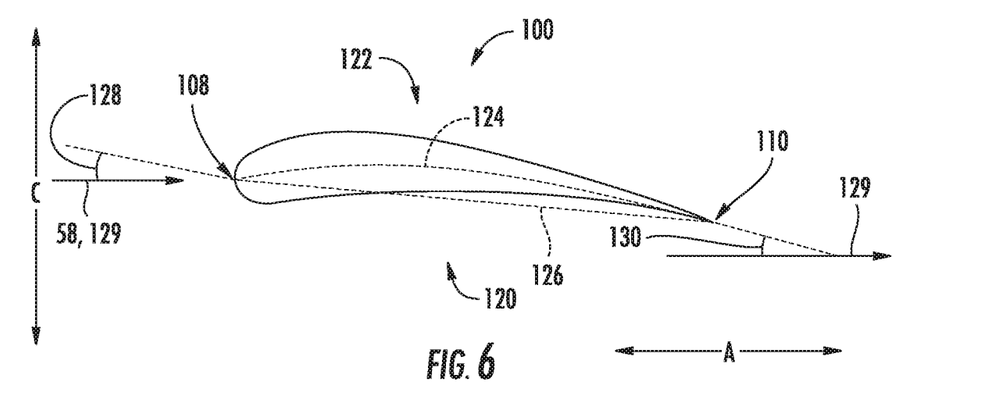
FIG. 6 is a cross-sectional view of the part span inlet guide vane of the exemplary gas turbine engine of FIG. 1 at a second location along the span of the part span inlet guide vane.

Moreover, it should be appreciated that for the embodiment of FIG. 2, the local swirl angle 130 increases from the radially inner end 104 to the radially outer end 102 of each part span inlet guide vane 100. For example, referring now also to FIG. 6, a cross-sectional view of a part span inlet guide vane 100 at a location radially inward from the cross-section viewed in FIG. 5, as indicated by Line 6-6 in FIG. 2, is provided. As is depicted in FIG. 6, and as stated above, the part span inlet guide vane 100 defines the pressure side 120, the suction side 122, the leading edge 108, the trailing edge 110, the camber line 124, and chord line 126. Further, the angle of attack 128 defined by the chord line 126 and the airflow direction 129 of the airflow 58 through the inlet 60 of the nacelle 50 at the location along the span 106 depicted in FIG. 6 is less than the angle of attack 128 at the location along the span 106 depicted in FIG. 5 (e.g., may be at least about twenty percent less, such as at least about fifty percent less, such as up to about one hundred percent less). Additionally, the part span inlet guide vane 100 defines a local swirl angle 130 at the trailing edge 110 at the location along the span 106 of the part span inlet guide vane 100 proximate the inner end 104, as depicted in FIG. 6. As stated above, the local swirl angle 130 increases from the radially inner end 104 to the radially outer end 102 of each part span inlet guide vanes 100. Accordingly, the local swirl angle 130 proximate the outer end 102 (see FIG. 5) is greater than the local swirl angle 130 proximate the radially inner end 104 (see FIG. 6; e.g., the radially inner ten percent of the span 106). For example, the local swirl angle 130 may approach zero degrees (e.g., may be less than about five degrees, such as less than about two degrees) at the radially inner end 104.

Notably, including part span inlet guide vanes 100 of such a configuration may reduce an amount of turbulence at the radially inner end 104 of each respective part span inlet guide vane 100. Additionally, such a configuration may provide a desired amount of pre-swirl at the radially outer ends of the plurality of fan blades 40 of the fan 38 (where the speed of the fan blades 40 is the greatest) to provide a desired reduction in flow separation and/or shock losses that may otherwise occur due to a relatively high speed of the plurality of fan blades 40 at the fan tips during operation of the turbofan engine 10.

Referring generally to FIGS. 2, 3, 5, and 6, it will be appreciated that for the embodiment depicted, the plurality of part span inlet guide vanes 100 further define a solidity. The solidity is defined generally as a ratio of a chord length (i.e., a length of the chord line 126) of each part span inlet guide vane 100 to a circumferential spacing 118 of the plurality of part span inlet guide vanes 100. More specifically, for the purposes of defining the solidity, the circumferential spacing 118 refers to the mean circumferential spacing 118 calculated using the following equation:

$$2 \times \pi \times r_m^2 \div n_b$$ (Equation 1);

wherein $r_m$ is the mean radius of the plurality of part span inlet guide vanes 100 and $n_b$ is the number of part span inlet guide vanes 100. The mean radius, $r_m$, may refer to a position halfway along the IGV span 106, relative to the longitudinal centerline 12 of the turbofan engine 10. Notably, for the purposes of calculating solidity, the chord length refers to the chord length at the mean radius, $r_m$. For the embodiment depicted, the solidity is between about 0.5 and is about 1.5. For example, in certain exemplary embodiments, the solidity of the part span inlet guide vanes 100 may be between about 0.7 and 1.2, such as between about 0.9 and about 1.0. Such a configuration may ensure desired amount of pre-swirl during operation of the turbofan engine 10.

Notably, the plurality of part span inlet guide vanes 100 depicted in FIGS. 1 through 6 are generally configured to pre-swirl a portion of an airflow through the inlet 60 of the outer nacelle 50 in a rotational direction that is the same as a rotational direction of the plurality of fan blades 40 of the fan 38. For example, for the exemplary embodiment of FIGS. 1 through 6, the plurality of fan blades 40 of the fan 38 are configured to rotate clockwise when viewed forward looking aft and the plurality of part-span inlet guide vanes 100 (and other pre-swirl features discussed herein) are configured to pre-swirl a portion of the airflow through the inlet 60 of the outer nacelle 50 in the same direction. However, in other exemplary embodiments the gas turbine engine may include a fan 38 with fan blades 40 configured to rotate counter-clockwise when viewed forward looking aft, in which case the plurality of part-span inlet guide vanes 100 (or other pre-swirl features discussed herein) may instead be mirrored such that they are configured to pre-swirl airflow in an opposite rotational direction than the direction depicted. Further, in still other exemplary embodiments, the plurality of part-span inlet guide vanes 100 (or other pre-swirl features discussed herein) may be configured to pre-swirl an airflow in an opposite rotational direction as the plurality of fan blades 40 of the fan 38.

Additionally, it should be appreciated that the exemplary part span inlet guide vanes 100 depicted in FIGS. 1 through 6 are provided by way of example only. In other exemplary embodiments, the plurality of part span inlet guide vanes 100 may have any other suitable configuration for providing a desired amount of pre-swirl upstream of a plurality of fan blades 40 of a fan 38 of a gas turbine engine.

Figure 7:
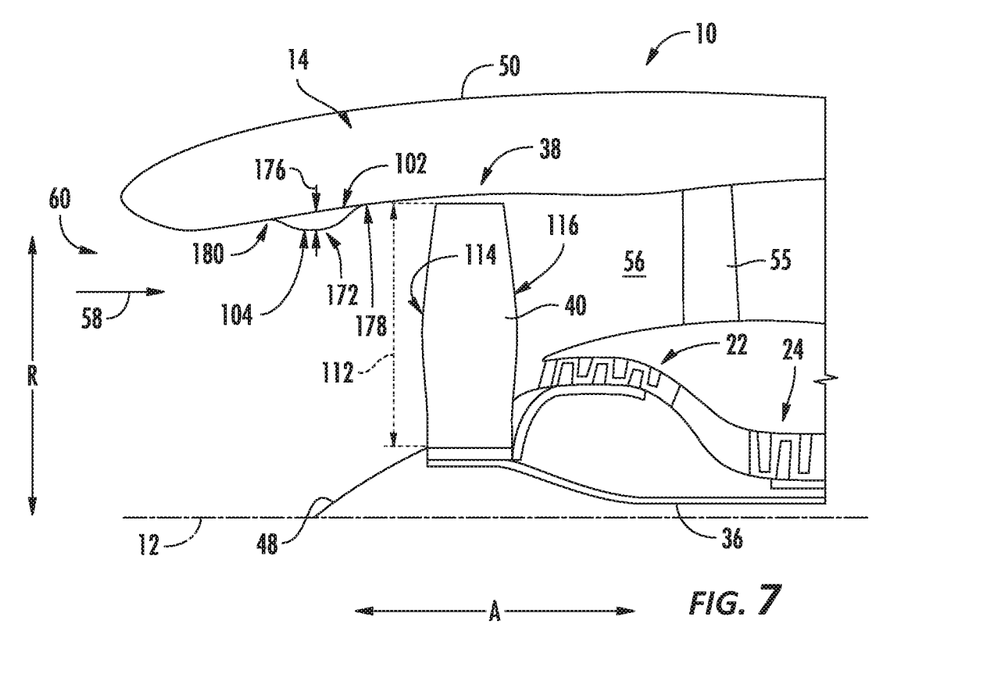
FIG. 7 is a close-up, schematic, cross-sectional view of a forward end of a gas turbine engine in accordance with yet another exemplary embodiment of the present disclosure.

It should further be appreciated that in still other embodiments of the present disclosure any other suitable inlet pre-swirl feature may be provided at a location upstream of the plurality of fan blades 40 of the fan 38 of the gas turbine engine and downstream of an inlet 60 of an outer nacelle 50. For example, referring now to FIG. 7, an inlet pre-swirl feature of a gas turbine engine in accordance with another exemplary embodiment of the present disclosure is provided. More specifically, FIG. 7 depicts a turbofan engine 10 in accordance with an embodiment of the present disclosure, configured in substantially the same manner as the exemplary turbofan engine 10 described above with reference to FIGS. 1 and 2. Accordingly, the exemplary turbofan engine 10 of FIG. 7 generally includes a turbomachine 16 and a fan section 14. The turbomachine 16, although not depicted, includes a turbine section having a drive turbine, or LP turbine 30 (see FIG. 1), mechanically coupled to a fan 38 of the fan section 14 through, for the embodiment depicted, an LP shaft 36. Additionally, the fan 38 includes a plurality of fan blades 40 rotatable about a longitudinal centerline 12 of the turbomachine 16. The plurality of fan blades 40 of the fan 38 are surrounded by, and enclosed by, an outer nacelle 50 of the turbofan engine 10, the outer nacelle 50 including an inner wall 52. Further, the exemplary turbofan engine 10 includes an inlet pre-swirl feature attached to or integrated with the inner wall 52 of the outer nacelle 50 at a location forward of the plurality of fan blades 40 of the fan 38.

Figure 8:
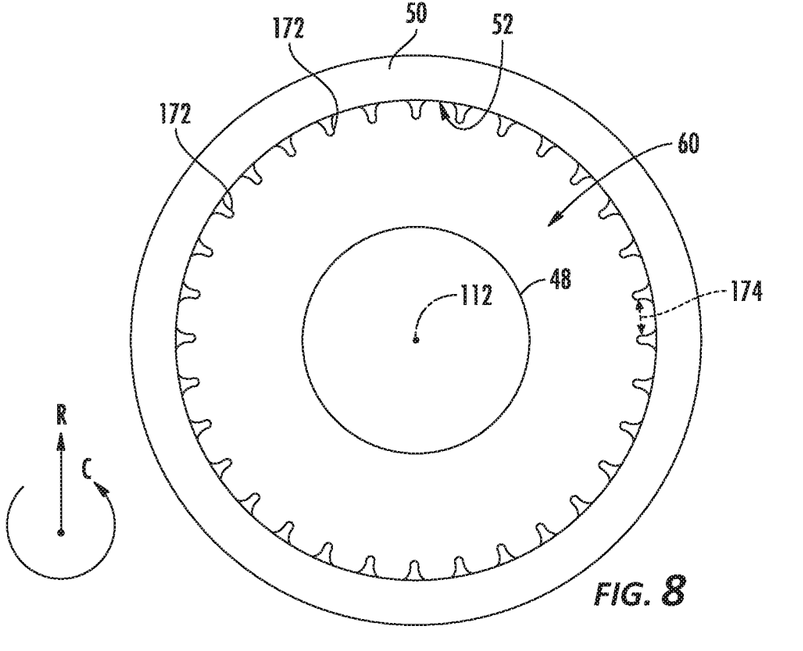
FIG. 8 is a schematic view of an inlet to the exemplary gas turbine engine of FIG. 7, along an axial direction of the gas turbine engine of FIG. 7.

However, for the embodiment of FIG. 7, the inlet pre-swirl feature does not include a plurality of part span inlet guide vanes 100, and instead is configured as a plurality of pre-swirl contours 172 positioned forward of the fan blades 40 of the fan 38 along the axial direction A and extending inwardly along the radial direction R. Each of the plurality of pre-swirl contours 172 may be spaced along the circumferential direction C of the turbofan engine 10. For example, referring now also to FIG. 8, providing a schematic, axial view of the inlet 60 to the turbofan engine 10, each of the plurality of pre-swirl contours 172 are spaced substantially evenly along the circumferential direction C, such that each adjacent pre-swirl contour 172 defines a substantially uniform circumferential spacing 174. Additionally, it should be appreciated that the exemplary turbofan engine 10 may include any suitable number of pre-swirl contours 172. For example, in certain exemplary embodiments the plurality of pre-swirl contours 172 includes between about five pre-swirl contours 172 and about eighty pre-swirl contours 172, such as between about thirty pre-swirl contours 172 and about fifty pre-swirl contours 172, and more specifically, for the embodiment depicted, includes thirty-two pre-swirl contours 172.

Figure 9:
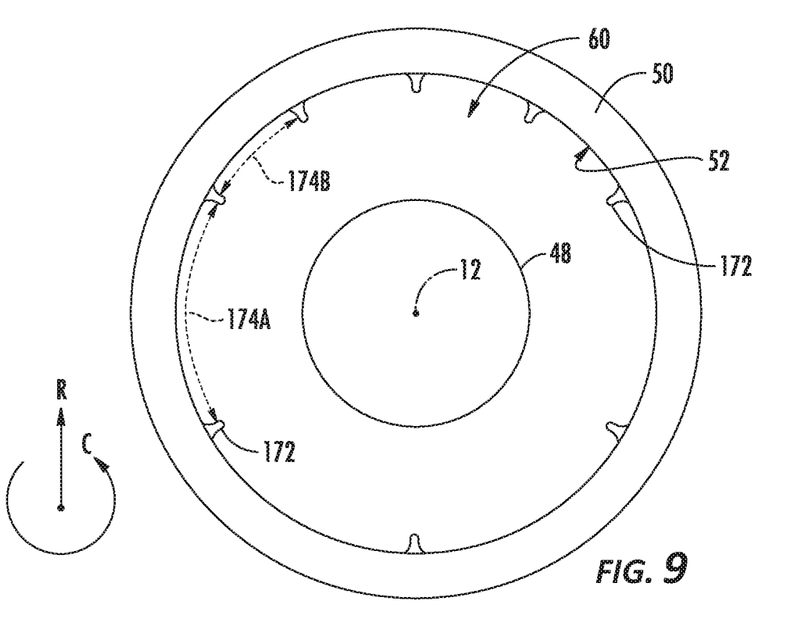
FIG. 9 it is a schematic view of an inlet to a gas turbine engine in accordance with another exemplary embodiment of the present disclosure.

However, in other exemplary embodiments, the plurality of pre-swirl contours 172 may have any other suitable spacing. For example, referring briefly to FIG. 9, providing a schematic, axial view of an inlet 60 of a turbofan engine 10 in accordance with another exemplary embodiment of the present disclosure, the plurality of pre-swirl contours 172 may define a non-uniform circumferential spacing 174. For example, at least certain of the plurality of pre-swirl contours 172 define a first circumferential spacing 174A, while other of the plurality of pre-swirl contours 172 define a second circumferential spacing 174B. For the embodiment depicted, the first circumferential spacing 174A is at least about twenty percent greater than the second circumferential spacing 174B, such as at least about twenty-five percent greater such as at least about thirty percent greater, such as up to about two hundred percent greater. The circumferential spacing 174 refers to a mean circumferential spacing between adjacent pre-swirl contours 172.

Figure 10:
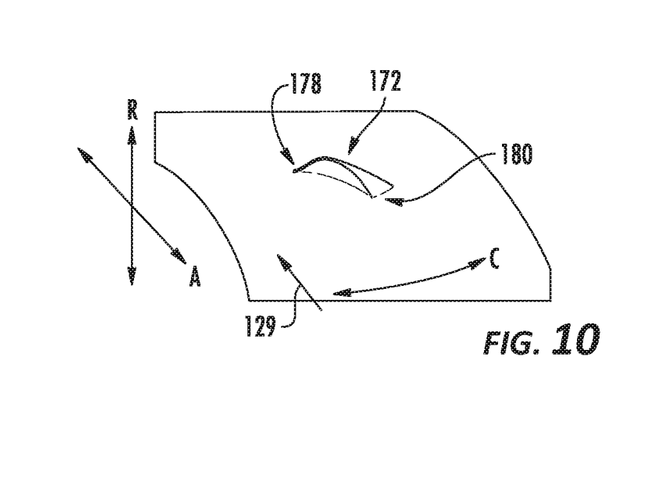
FIG. 10 is a perspective view of a pre-swirl contour of the exemplary gas turbine engine of FIG. 7.
Figure 11:
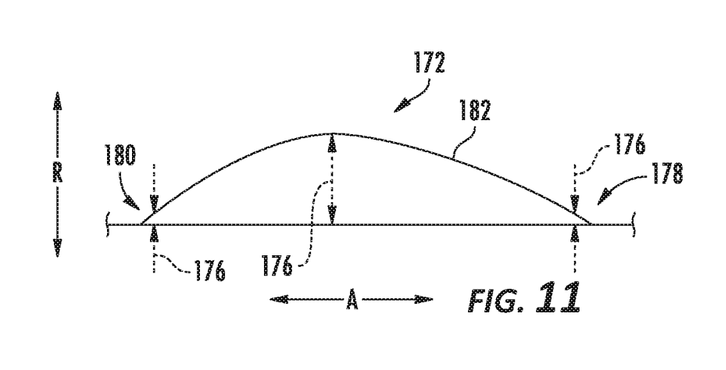
FIG. 11 is a side view of the exemplary pre-swirl contour of the exemplary gas turbine engine of FIG. 7.
Figure 12:
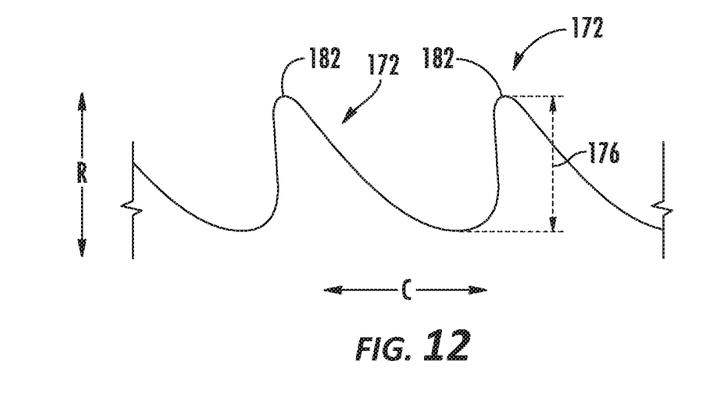
FIG. 12 is a lengthwise cross-sectional view of a plurality of pre-swirl contours, including the exemplary pre-swirl contour of the exemplary gas turbine engine of FIG. 7.
Figure 13:
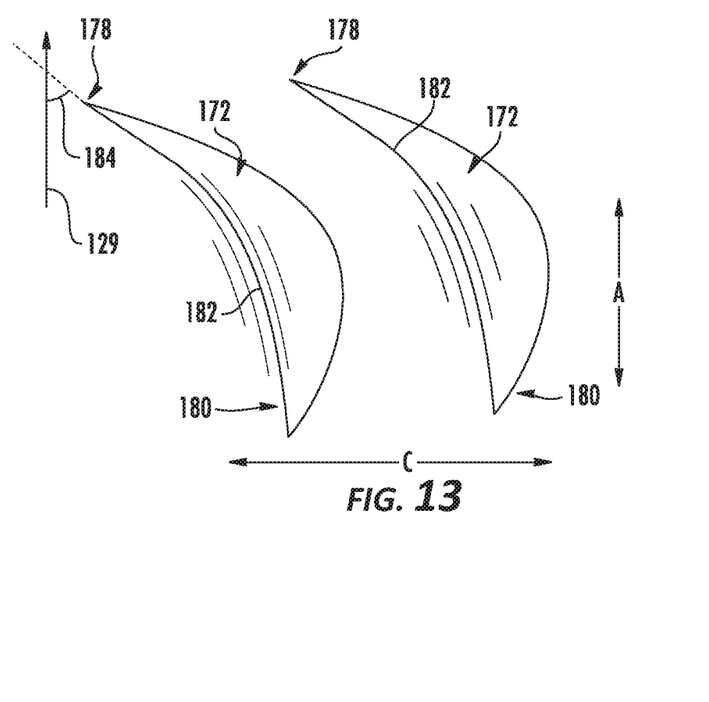
FIG. 13 is a top view of a plurality of pre-swirl contours, including the exemplary pre-swirl contour of the exemplary gas turbine engine of FIG. 7.

Referring now also to FIGS. 10 through 13, various other views of one or more of the plurality pre-swirl contours 172 of FIG. 7 are provided. More specifically, FIG. 10 provides a perspective view of the exemplary pre-swirl contour 172 of FIG. 7; FIG. 11 provides a side view of the exemplary pre-swirl contours 172 are of FIG. 7; FIG. 12 provides a cross-sectional view of a plurality of pre-swirl contours 172, including the exemplary pre-swirl contour 172 of FIG. 7; and FIG. 13 provides a top view of a plurality of pre-swirl contours 172, including the exemplary pre-swirl contour 172 FIG. 7.

Referring first particularly to FIG. 10, it will be appreciated that for the embodiment depicted, the plurality of pre-swirl contours 172 are formed integrally with the inner wall 52 of the outer nacelle 50 to form a monolithic component. For example, the inner wall 52 of the outer nacelle 50 may be formed by casting to include the plurality of pre-swirl contours 172, or alternatively the inner wall 52 of the outer nacelle 50 may be stamped to include the plurality of pre-swirl contours 172, or alternatively, still, the inner wall 52 of the outer nacelle 50 may be formed using a suitable additive manufacturing technique. However, it should be appreciated that in other exemplary embodiments the plurality of pre-swirl contours 172 may instead be formed separately from the inner wall 52 and attached to the inner wall 52 of the outer nacelle 50 (or some other component of the outer nacelle 50) in any other suitable manner.

Referring particularly to FIGS. 11 and 12, it will be appreciated that each of the plurality of pre-swirl contours 172 defines a height 176 along the radial direction R, and further extends generally from an aft end 178 to a forward end 180. Additionally, for the exemplary embodiment depicted, the pre-swirl contours 172 each define an arcuate shape along the axial direction A, extending from the forward end 180 to the aft end 178. Accordingly, the height 176 of the pre-swirl contour 172 varies along a length thereof. More particularly, at the forward ends 180 of the pre-swirl contours 172, the height 176 of each respective pre-swirl contour 172 is approximately equal to zero (e.g., less than five percent of a maximum height 176), and similarly at the aft ends 178 of the pre-swirl contours 172 the height 176 of each respective pre-swirl contours 172 is approximately equal to zero (e.g., less than five percent of a maximum height 176).

Moreover, referring now also particularly to FIG. 13, each of the plurality pre-swirl contours 172 further defines a ridge line 182, each ridge line 182 tracking a peak height 176 of the respective pre-swirl contour 172 between the forward and aft ends 180, 178 of the respective pre-swirl contour 172. A maximum height 176 of each of the plurality of pre-swirl contours 172 for the embodiment depicted is located within a middle seventy-five percent of the respective ridge line 182, as measured along a total length of the respective ridge line 182. More specifically, for the embodiment depicted, the maximum height 176 of each of the plurality of pre-swirl contours 172 is located within a middle fifty percent of the respective ridge line 182.

Additionally, the maximum height 176 of each of the plurality of pre-swirl contours 172 may be sufficient to provide a desired amount of pre-swirl to an airflow 58 received through an inlet 60 of the outer nacelle 50 (see FIG. 7). For example, in certain exemplary embodiments, the maximum height 176 of each of the plurality of pre-swirl contours 172 may be between about two percent and about forty percent of a fan blade span 112 of a fan blade 40 of the fan 38 (see FIG. 7). For example, in certain exemplary embodiments, the maximum height 176 of each of the plurality of pre-swirl contours 172 may be between about five percent and about thirty percent of a fan blade span 112 of a fan blade 40, such as between about ten percent and about twenty-five percent of a fan blade span 112 of a fan blade 40.

Further, the plurality of pre-swirl contours 172 define a swirl angle 184. With reference to the pre-swirl contours 172, the swirl angle 184 refers to an angle of the ridge line 182 relative to an airflow direction 129 of the airflow 58 through the inlet 60 of the nacelle 50 during operation of the turbofan engine 10, which may be parallel to the axial direction A of the turbofan engine 10. Referring particularly to FIG. 13, a maximum swirl angle 184 is defined by the aft twenty-five percent of the ridge line 182. Additionally, for the embodiment depicted, the maximum swirl angle 184 of each of the plurality of contours 172 is between about five degrees and about forty degrees. For example, the maximum swirl angle 184 of each of the plurality of contours 172 may be between about ten degrees and about thirty degrees, such as between about fifteen degrees and about twenty-five degrees. Notably, although the aft twenty-five percent of the ridge line 182 for the embodiment depicted is substantially straight, in other exemplary embodiments, it may define a curve. In such embodiments, the maximum swirl angle 184 may be defined with a reference line equal to an average of the aft twenty-five percent of the ridge line 182. The average of the aft twenty-five percent of the ridge line 182 may be found using, e.g., least mean squares or suitable method.

It will be appreciated, however, that the exemplary pre-swirl contours 172 described herein with reference to FIGS. 7 through 13 are provided by way of example only. In other exemplary embodiments, the plurality of pre-swirl contours 172 may have any other suitable shape and/or configuration. For example, in other exemplary embodiments, one or more of the plurality of pre-swirl contours 172 may not define an arcuate shape, and may, for example, define a height 176 greater than zero at one or both of the forward end 180 and aft end 178. Additionally, in other exemplary embodiments, the plurality of pre-swirl contours 172 may not each define substantially the same shape. For example, in other exemplary embodiments, one or more the plurality of pre-contours 172 may define a maximum height 176 greater than an adjacent pre-swirl contour 172.

Additionally, it will be appreciated that inclusion of one or more of the plurality of pre-swirl contours 172 in accordance with an exemplary embodiment of the present disclosure may provide for an increased efficiency of the turbofan engine 10 when operating with, e.g., relatively high fan tip speeds. For example, the plurality of pre-swirl contours 172 may provide an amount of pre-swirl to an airflow 58 through an inlet 60 of a nacelle 50 of the turbofan engine 10, such that the airflow 58 at the radially outer ends of the fan blades 40 of the fan 38 is less susceptible to separation from the plurality of fan blades 40 and/or shock losses.

Referring now to FIG. 14, a flow diagram is provided of a method 300 for operating a direct drive gas turbine engine in accordance with an exemplary aspect of the present disclosure. The exemplary direct drive turbofan engine may be configured in accordance with one or more the exemplary gas turbine engines described above with reference to FIGS. 1 through 13. Accordingly, for example, the direct drive gas turbine engine may include a turbine section having a drive turbine and a fan section having a fan driven by the drive turbine.

The exemplary method 300 generally includes at (302) rotating the fan of the gas turbine engine with the drive turbine of the turbine section of the gas turbine engine such that the fan rotates at an equal rotational speed as the drive turbine. Additionally, for the exemplary aspect depicted, rotating the fan of the gas turbine engine with the drive turbine at (302) include at (304) rotating the fan of the gas turbine engine with the drive turbine such that the fan defines a fan pressure ratio less than 1.5. More specifically, for the exemplary aspect depicted, rotating the fan of the gas turbine engine at (304) further includes at (306) rotating the fan of the gas turbine engine with the drive turbine such that the fan defines a fan pressure ratio between 1.15 and 1.5, and further still at (308) rotating the fan of the gas turbine engine with the drive turbine such that the fan defines a fan pressure ratio between 1.25 and 1.5.

Referring still to FIG. 23, rotating the fan of the gas turbine engine with the drive turbine at (304) further includes at (310) rotating the fan of the gas turbine engine with the drive turbine such that a fan blade the fan defines a fan tip speed greater than 1,250 feet per second. More specifically, for the exemplary aspect depicted, rotating the fan of the gas turbine engine with the drive turbine at (304) further includes at (312) rotating the fan of the gas turbine engine with the drive turbine such that the fan blade of the fan defines a fan tip speed between about 1,350 feet per second and about 2,200 feet per second. More specifically, still, for the exemplary aspect depicted, rotating the fan of the gas turbine engine with the drive turbine at (304) further includes at (314) rotating the fan of the gas turbine engine with the drive turbine such that the fan blade of the fan defines a fan tip speed greater than about 1,450 feet per second, and at (316) rotating the fan of the gas turbine engine with the drive turbine such that the fan blade of the fan defines a fan tip speed greater than about 1,550 feet per second.

Further, as is also depicted, for the embodiment FIG. 14, rotating the fan of the gas turbine engine with the drive turbine at (304) includes at (318) operating the gas turbine engine at a rated speed. For example, operating the gas turbine engine at the rated speed at (318) may include operating the gas turbine at a maximum speed to produce a maximum rated power.

Moreover, the exemplary method 300 further includes at (320) pre-swirling a flow of air provided to the fan of the gas turbine engine during operation of the gas turbine engine. For the exemplary aspect depicted, pre-swirling the flow of air at (320) includes at (322) pre-swirling the flow of air provided to the fan of the gas turbine engine using an inlet pre-swirl feature located upstream of the plurality of fan blades of the fan and attached to or integrated into a nacelle of the gas turbine engine. In certain exemplary aspects, the inlet pre-swirl feature may be configured in accordance with one or more of the exemplary inlet pre-swirl features described above with reference to FIGS. 1 through 13.

Operating a direct drive gas turbine engine in accordance with the exemplary aspect described above with reference to FIG. 14 may result in a more efficiently operated gas turbine engine. Further, when the airflow provided to the fan is pre-swirled, such may reduce an amount of separation or shock losses of the airflow with the fan despite the relatively high fan tip speeds at which the fan is operated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
   a turbomachine;
   a fan rotatable by the turbomachine, the fan comprising a plurality of fan blades; and
   an outer nacelle surrounding the plurality of fan blades and comprising an inner wall, the inner wall of the outer nacelle comprising a plurality of pre-swirl contours positioned forward of the plurality of fan blades of the fan along the axial direction and extending inwardly along the radial direction,
   wherein each of the plurality of pre-swirl contours defines a arcuate ridge line and a maximum height, wherein the maximum height is located within a middle seventy-five percent of the ridge line, and wherein a maximum swirl angle is defined by an aft twenty-five percent of the ridge line.

2. The gas turbine engine of claim 1, wherein each of the plurality of fan blades defines a fan blade span along the radial direction, wherein each of the plurality of pre-swirl contours defines the maximum height along the radial direction, and wherein the maximum height of each of the plurality of pre-swirl contours is between two percent and forty percent of the fan blade span of the plurality of fan blades.

3. The gas turbine engine of claim 2, wherein the maximum height of each of the plurality of pre-swirl contours is between five percent and thirty percent of the fan blade span of the plurality of fan blades.

4. The gas turbine engine of claim 1, wherein the plurality of pre-swirl contours includes between five pre-swirl contours and eighty pre-swirl contours.

5. The gas turbine engine of claim 1, wherein the plurality of pre-swirl contours includes between thirty pre-swirl contours and fifty pre-swirl contours.

6. The gas turbine engine of claim 1, wherein each of the plurality of pre-swirl contours defines the maximum swirl angle, and wherein the maximum swirl angle of each of the plurality of pre-swirl contours is between five degrees and forty degrees.

7. The gas turbine engine of claim 1, wherein each of the plurality of pre-swirl contours defines the maximum height, a forward end, and an aft end, and wherein a height of each of the plurality of pre-swirl contours at the forward end and at the aft end is less than about ten percent of the maximum height.

8. The gas turbine engine of claim 1, wherein the plurality of pre-swirl contours are formed integrally with at least a portion of the inner wall of the outer nacelle.

9. The gas turbine engine of claim 1, wherein each of the plurality of pre-swirl contours defines an arcuate shape along the axial direction.

10. The gas turbine engine of claim 9, wherein the fan defines a fan pressure ratio less than 1.5 and a fan tip speed greater than 1,250 feet per second during operation of the gas turbine engine at a rated speed.

11. The gas turbine engine of claim 1, wherein the turbomachine comprises a drive turbine, wherein the fan is mechanically coupled to and rotatable with the drive turbine such that the fan is rotatable by the drive turbine at the same rotational speed as the drive turbine.

12. The gas turbine engine of claim 1, wherein the plurality of pre-swirl contours are attached to the inner wall of the outer nacelle.

13. An outer nacelle for a gas turbine engine comprising a fan and defining an axial direction and a radial direction, the outer nacelle comprising:
   an inner wall surrounding a plurality of fan blades of the fan when installed in the gas turbine engine, the inner wall comprising a plurality of pre-swirl contours positioned forward of the plurality of fan blades of the fan along the axial direction when installed in the gas turbine engine and extending inwardly along the radial direction,
   wherein each of the plurality of pre-swirl contours defines a arcuate ridge line and a maximum height, wherein the maximum height is located within a middle seventy-five percent of the ridge line, and wherein a maximum swirl angle is defined by an aft twenty-five percent of the ridge line.

14. The outer nacelle of claim 13, wherein each of the plurality of fan blades defines a fan blade span along the radial direction, wherein each of the plurality of pre-swirl contours defines the maximum height along the radial direction, and wherein the maximum height of each of the plurality of pre-swirl contours is between two percent and forty percent of the fan blade span of the plurality of fan blades.

15. The outer nacelle of claim 14, wherein the maximum height of each of the plurality of pre-swirl contours is between five percent and thirty percent of the fan blade span of the plurality of fan blades.

16. The outer nacelle of claim 13, wherein the plurality of pre-swirl contours includes between five pre-swirl contours and eighty pre-swirl contours.

17. The outer nacelle of claim 13, wherein the plurality of pre-swirl contours includes between thirty pre-swirl contours and fifty pre-swirl contours.

18. The outer nacelle of claim 13, wherein each of the plurality of pre-swirl contours defines the maximum swirl angle, and wherein the maximum swirl angle of each of the plurality of pre-swirl contours is between five degrees and forty degrees.

19. The outer nacelle of claim 13, wherein each of the plurality of pre-swirl contours define an arcuate shape along the axial direction.

20. The outer nacelle of claim 13, wherein the plurality of pre-swirl contours are attached to or integrally formed with at least a portion the inner wall of the outer nacelle.

\* \* \* \* \*